United States Patent [19]

Grace

[11] Patent Number: 5,519,859
[45] Date of Patent: May 21, 1996

[54] METHOD AND APPARATUS FOR AUTOMATIC TABLE SELECTION AND GENERATION OF STRUCTURED QUERY LANGUAGE INSTRUCTIONS

[76] Inventor: John A. Grace, 616 N. York, Hinsdale, Ill. 60521

[21] Appl. No.: 153,136

[22] Filed: Nov. 15, 1993

[51] Int. Cl.⁶ ........................................ G06F 17/30
[52] U.S. Cl. ...................... 395/600; 364/DIG. 1; 364/283.4
[58] Field of Search ............................. 395/600

[56] References Cited

U.S. PATENT DOCUMENTS

| | | | |
|---|---|---|---|
| 4,774,661 | 9/1988 | Kumpati | 395/600 |
| 5,197,005 | 3/1993 | Shwartz et al. | 395/600 |
| 5,287,493 | 2/1994 | Jacopi | 395/600 |
| 5,297,280 | 3/1994 | Potts, Sr. et al. | 395/600 |
| 5,325,465 | 6/1994 | Hung et al. | 395/63 |
| 5,418,950 | 5/1995 | Li et al. | 395/600 |
| 5,428,776 | 6/1995 | Rothfield | 395/600 |
| 5,448,726 | 9/1995 | Cramsie et al. | 395/600 |

OTHER PUBLICATIONS

Declaration of John A. Grace.

*Primary Examiner*—Thomas G. Black
*Assistant Examiner*—John C. Loomis
*Attorney, Agent, or Firm*—Willian Brinks Hofer Gilson & Lione

[57] ABSTRACT

A method and apparatus is provided for generating structured query language instructions for communication to a database. In response to receipt of user-supplied input dimensions, an output table is automatically selected that represents the user's query of the relational database. The system automatically identifies and generates the links between data in predefined data tables within the database and the automatically selected output table. From the output table and data links, structured query language instructions are automatically generated. A technique is included to select the minimum number of tables reflective of the input dimensions. Each link between the input data tables and the output table is checked bi-directionally to ensure the integrity of the table selected.

24 Claims, 7 Drawing Sheets

BLOCK DIAGRAM
OF APPARATUS

EXAMPLE 1. SIMPLE THREE DIMENSION QUERY, STORE, WEEK, PRODUCT.

EXAMPLE 2. WEEK, BRAND AND STORES ARE THE INPUT DIMENSIONS. NOTE: BRAND IN NOT A PRIMARY DIMENSION, IT REQUIRES UPC.

EXAMPLE 3. BRAND LOCATED THE PRIMARY DIMENSION UPC. NEXT, THE SALE TABLE WAS SELECTED BECAUSE IT'S PRIMARY DIMENSIONS MATCH THOSE OF THE INPUT DIMENSIONS.

EXAMPLE 4. THE ACTUAL SQL. NOTE THE FROM CLAUSE HAS FIVE TABLES MIRRORING THE FIVE TABLES SELECTED IN THE DIAGNOSTICS.

FIG. 6a

```
┌─────────────────────────────────────────────────────────────┐
│                        QUASAR.ANT                    ▼│▲    │
├─────────────────────────────────────────────────────────────┤
│ FILE EDIT MEASURES OPTIONS RUN LOGON                        │
│   OUTPUT        │         ┌─────────────┐         ▼│▲       │
│   WEEK          │         │STORE NUMBER │                   │
│ ┌──────┐        │         └─────────────┘                   │
│ │UNITS │                                                    │
│ │PRICE │                                                    │
│ │COST  │                                                    │
│ │MARGIN│                                                    │
│ │PROFIT│                                                    │
│ │AD    │                                                    │
│ │DISPLAY│                                                   │
│ │COUPON│      ⟋214                                          │
│ │STORE#│                                 = 27000  ┌──────┐  │
│ └──────┘    ┌──────────┐                          │BRAND │  │
│             │LAST YEAR │                          └──────┘  │
│             └──────────┘                                    │
│                      BT 01/01/94,04/30/94                   │
│                                                             │
│                                          ✳                  │
│             ┌────┐                                          │
│             │WEEK│                                          │
│             └────┘                                          │
│                                                             │
│  EXAMPLE 5. THIS YEAR COMPARED TO LAST                      │
│             YEAR QUERY.                                     │
│  NOTE: THE ONLY DIFFERENCE IS THE ADDITION OF THE LAST      │
│        YEAR DIMENSIA                                        │
└─────────────────────────────────────────────────────────────┘
```

FIG. 6b

```
┌─────────────────────────────────────────────────────────────┐
│                 THE ANT COLONY-DIAGNOSTICS           ▼│▲    │
├─────────────────────────────────────────────────────────────┤
│ FILE EDIT                                                   │
│    ┌─────────────┐                                          │
│    │ WEEK TD     │                                          │
│    ├─────────────┤─── 204                                   │
│    │ WEEK        │                                          │
│    └─────────────┘                                          │
│    ┌─────────────┐                                          │
│    │ BRAND       │                                          │
│    ├─────────────┤─── 206                                   │
│    │ UDC         │                                          │
│    └─────────────┘                                          │
│    ┌─────────────┐                                          │
│    │ WEEK LD     │                                          │
│    ├─────────────┤─── 216                                   │
│    │ WEEK        │                                          │
│    └─────────────┘                                          │
│    ┌─────────────┐                                          │
│    │ STORES      │                                          │
│    ├─────────────┤─── 202                                   │
│    │ STORE NUMBER│                                          │
│    └─────────────┘                                          │
│                                                             │
│  EXAMPLE 6. THIS YEAR COMPARED TO LAST YEAR, THE INPUT      │
│             DIMENSIONS.                                     │
└─────────────────────────────────────────────────────────────┘
```

EXAMPLE 7. THIS YEAR COMPARED TO LAST YEAR USING A SELF-JOIN. TABLE ARE SHADOWED

EXAMPLE 8. THIS YEAR COMPARED TO LAST YEAR, THE ACTUAL SQL. NOTE: THE SALES TABLES FOR THIS YEAR (TY) AND LAST YEAR (LY).

METHOD AND APPARATUS FOR AUTOMATIC TABLE SELECTION AND GENERATION OF STRUCTURED QUERY LANGUAGE INSTRUCTIONS

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention relates to a system for automatically generating a sequence of structured query language instructions for use with a relational database, and more specifically, to a method and apparatus for automatically identifying tables of intersecting data and relationally linking the data for communication to the database.

BACKGROUND OF THE INVENTION

Computer systems for generating structured query language ("SQL") instructions are known and have been generally available on the market. These systems commonly provide as output a series of SQL instructions that reflect a user's query of information stored within a relational database. The SQL instructions, therefore, are generated in a format sufficient for direct communication and input to the computer containing the relational database.

Examples of several SQL generator programs presently available on the market include: Metaphor/DIS, sold by International Business Machine Corporation; Quest, sold by Gupta, Inc.; and Access, sold by Microsoft Corporation. Although each of the packages available on the market has its own particularities, the approach used in Metaphor for generating a series of SQL statements is typical of most SQL generators.

The Metaphor program requires the user/developer to explicitly define the search query, including table selection, followed by column selection. As those skilled in the art will appreciate, it is the step of table selection where Metaphor, as well as the other currently available programs, becomes rigid and difficult to use. For example, columns cannot be selected with these programs until a table has been selected. Further, the number and similarity of tables can make selection difficult even for the most experienced user. For a predefined application, therefore, all possible queries must be specifically defined in advance, no matter how similar the query.

Programs like Metaphor require that each permutation of a query be defined prior to use of the relational database. Later, when a small change may be required to a previously run query, the small change must be performed separately to each permutation of the query. Consequently, maintenance and upkeep of preexisting queries using the known and available programs often requires more skill and time than the original development of the queries.

The SQL generators generally available on the market also suffer from another problem. Because queries are hard-wired upon creation, for each new query a programmer or administrator must be employed to translate the query or write a program to protect the user from the query. Thus, for a typical user such as a business executive, there is no simple and efficient mechanism to generate and supply a query to the database. Because of the complexity of the table selection process and the level of technical knowledge required by the programmer or administrator, the lay user is simply too far removed from communicating directly with the database. As a result, the time from when a lay user generates a new query of a relational database until the time the user receives a response to the query can be substantial. This time delay is due in large part to the overhead costs of preparing and selecting by hand the new tables that must be communicated to the database to reflect the user's query.

What is lacking, is a system that allows a lay user to readily input new queries for communication to the relational database promptly and with minimal knowledge of the database or its programming. A system that would allow a lay user to simply provide input variables reflective of the user's query for communication to the database would make access to the database quicker and less cumbersome. Such a system would automatically select the tables necessary to reflect the user's new query, and based on that selection automatically generate the SQL instructions necessary to communicate the query to the relational database. In the process of automatically selecting such tables, the system would generate the necessary "Joins" to link up the input variable(s) supplied by the user to reflect their relation within the database.

SUMMARY OF THE INVENTION

In view of the above, a method is provided for communicating a plurality of structured query language instructions to a database. The steps of the method include receiving a plurality of input dimensions, automatically locating an intersection of common data between the input dimensions and generating a sequence of structured query language instructions for communication to the database. According to the invention, the input dimensions are provided for selectively obtaining relational information between data stored in the database. The series of structured query language instructions generated by the invention represent the relational query between the plurality of input dimensions.

In another aspect of the invention, the method can include, in addition to the above steps, the steps of storing a plurality of data in the database, defining a plurality of data tables assimilating the data stored in the database, identifying a subset of the data tables corresponding to the input dimensions, and dynamically selecting an output table representative of the intersection of common data between the subset of data tables. In one preferred embodiment of the invention, the input dimensions are supplied by a user. In another preferred embodiment of the invention, the plurality of data tables store the data in the database based upon a predefined criteria.

In another aspect of the invention, the method can further include the steps of generating at least one link between data within the output table and automatically checking the integrity of the link(s). In this aspect of the invention, the links are generated between data identified within the subset of data tables and corresponding data found within the output table. The plurality of structured query language instructions generated, therefore, represent the relationship(s) identified through the link(s) between the user-supplied input dimensions.

According to the invention, a system is also provided for communicating a plurality of structured query language instructions to a database containing a plurality of data. According to the invention, such a system would include input logic operable to receive a plurality of input dimensions, means coupled to the input logic for automatically identifying an intersection of data common to the plurality of input dimensions and an output coupled to the database for communicating a plurality of structured query language instructions to the database. In one aspect of the invention, each input dimension represents at least one datum stored in the database. Further, means may also be included for generating at least one link identifying the common data between the input dimensions. The plurality of structured query language instructions are thus developed from the generation of the at least one data link.

In yet another aspect of the invention, a plurality of structured query language instructions are communicated to a database having a plurality of data tables, which organize data stored in the database based upon a predefined criteria. In this aspect of the invention, the system further includes a memory for storing a translation of the data tables. Also included are a means for providing an indication of the data tables available in the database and a display from providing a visual representation of the plurality of input dimensions. Means are also provided for displaying the at least one data link on the display. In one preferred embodiment of the system, the display communicates information to a user, and the user supplies the plurality of input dimensions received by the input logic.

According to the invention, therefore, a system and method are provided for automatically selecting one or more tables identifying the intersection of input variables supplied by a user to query a database. Automatically selecting the tables eliminates the need for complex programming and redrafting of the data tables associated with a relational database. As a result, the user does not need to know the complexities or details of the database, or how it is programmed, to supply a query to the database. Thus, the time between identifying a database inquiry and receiving the results thereto is substantially reduced by the elimination of complex programming tasks.

The system advantageously selects an output table(s) in response to inquiries on a dynamic basis, thus reducing the overhead costs associated with hard-wiring data tables during the creation and modification of the relational database. The system also automatically generates the Join statements necessary to dynamically link the user-supplied input variables to reflect the relational query of the database. Due to the flexible nature of the table selection and linking process of the invention, the invention is readily compatible with most existing or newly created relational databases.

Further advantages of the invention include the ability to quickly generate many queries, which may differ only slightly from one another. Using the same SQL generator for each query of the system also ensures compatibility between the searches created on the system. In one preferred embodiment of the invention, the system is not tied to or dependent upon any particular programming language and is therefor further compatible with a plurality of different databases.

These and other features and advantages of the invention will be further understood upon consideration of the following detailed description of the presently preferred embodiments of the invention, taken in conjunction with the appended drawings.

BRIEF DESCRIPTION OF THE DRAWINGS

FIG. 5 is an example showing some of the displays provided in a preferred embodiment of the invention, where FIG. 6 is an example of a more complex query, where FIG. 6(a) is an illustration of the display of input dimensions for a benchmark query; FIG. 6(b) is an illustration of the tables selected in response to the benchmark query shown in FIG. 6(a)

DETAILED DESCRIPTION OF THE PRESENTLY PREFERRED EMBODIMENTS

Figure 1:
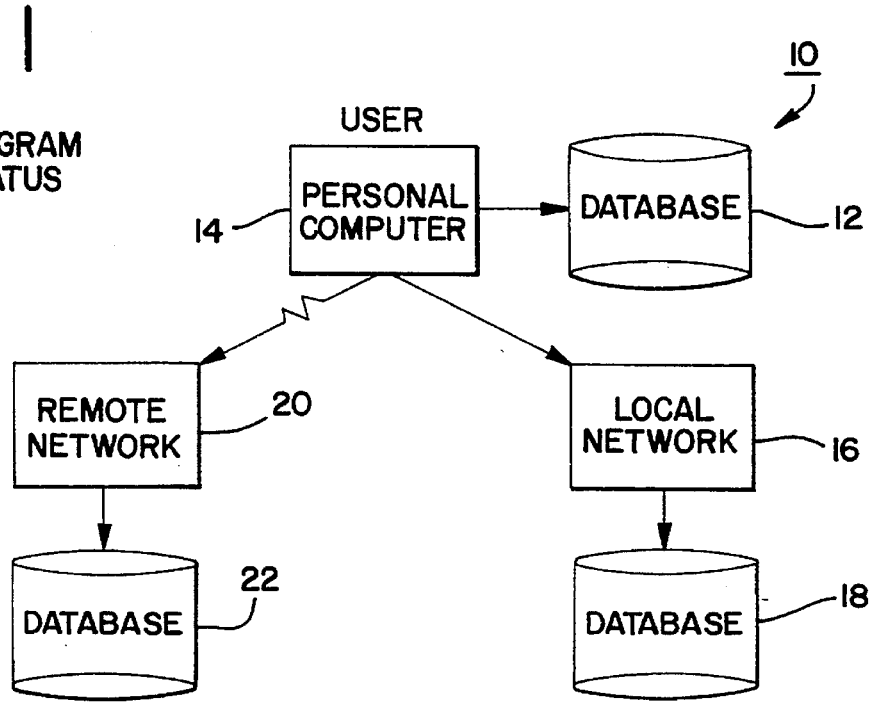
FIG. 1 is a block diagram of one preferred embodiment of the system of the invention.

Referring to FIG. 1, a block diagram of one presently preferred system employing the method and apparatus of the invention is generally shown at 10. In the preferred system, a database 12 is provided that preferably contains data organized in the form of a plurality of data tables. The data stored in the database 12 is therefore organized, preferably by a system administrator or programmer, to reflect some elemental relationship to other data in the database 12. It is the elemental relationship that forms the subject of a user query of the database to obtain or uncover more developed relationships amongst data contained within the database 12.

In the preferred system shown in FIG. 1, a user preferably communicates with the database through an external interface such as personal computer 14. The personal computer 14 executes the method for selecting tables and generating structured query language instructions for communication to the database 12.

Alternate embodiments of the invention are also shown in FIG. 1. For example, more than one database can be coupled to the interface. Additional databases 18, 22 allow the user to access vast quantities of data to obtain wider results for the user's relational queries. In one alternate embodiment, therefore, a database 18 can be coupled to the interface through a local network 16. Alternatively, a database 22 can also be coupled to the interface through a remote network 20, in a further alternate embodiment. As those skilled in the art will appreciate, therefore, one or more databases can be coupled to the system without departing from the spirit or essential scope of the invention. The number of databases, and the type of connection to the system, can vary and is only limited by the specific hardware requirements of each particular system.

In the preferred embodiment of the invention, the interface comprises a personal computer 14. The personal computer 14 is preferably an IBM-compatible personal computer as are widely known and generally available in the art. The particular specifications of the personal computer 14 can vary, but should at a minimum contain sufficient memory to store and run the table selection and link logic programs (described in detail below), and include input logic sufficient to receive a user's query. Such an input can take the form of a keyboard (not shown) or a mouse (not shown). Other types of inputs can be employed with the invention, and are also contemplated.

Figure 2:
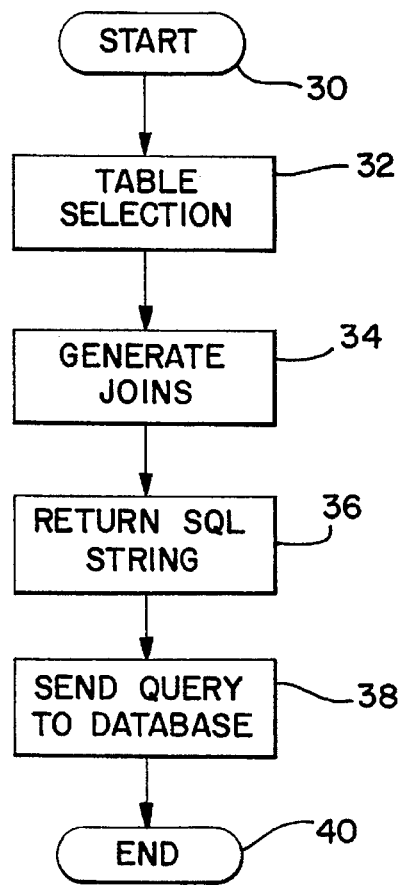
FIG. 2 represents an overall flow chart of the method of the invention.

An overall flow chart of the presently preferred table selection and link logic programs employed with the invention is shown in FIG. 2. In general, the program begins by receiving user input, in the form of variables, to query a relational database 12 (FIG. 1). In the preferred embodiment of the invention, the user input need not be one-dimensional variables. Accordingly, the user-supplied input variables can more accurately be described as dimensions of a multi-dimensional coordinate system. For example, three input variables can readily be visualized as the dimensions of a Cartesian coordinate system. As will be described in more detail below, it is the intersection of the user-supplied input dimensions that allows the generation of SQL instructions for communication to the database 12. This intersection is readily illustrated using a Cartesian coordinate graph or map, thus supporting the multi-dimensional mathematical expression of the user-supplied inputs.

Referring to FIG. 2, the program preferably begins at step 30 upon receipt of the user-supplied input dimensions forming the basis of the user's query of the database. Once the dimensions of the query have been received, the program proceeds at step 32 to select data tables reflecting the input dimensions and/or other data tables representing the relations of data stored in the database 12. In a preferred embodiment of the invention, the table selection process is executed as a subroutine (described below). Once tables that properly reflect the user's query have been selected, the necessary "Joins" employed in structured query language instructions are generated at step 34. Preferably, the linking of data tables to create the Join statements is also executed as a subroutine.

Flow of the program continues at step 36 where the SQL instructions are generated. Ultimately, the system communicates the user's query to the database at step 38 in the from of the sequence of SQL instructions generated in response to the user-supplied input dimensions. Program execution either halts at step 40 or can be resumed by receipt of a new set of user-supplied input dimensions.

Figure 3:
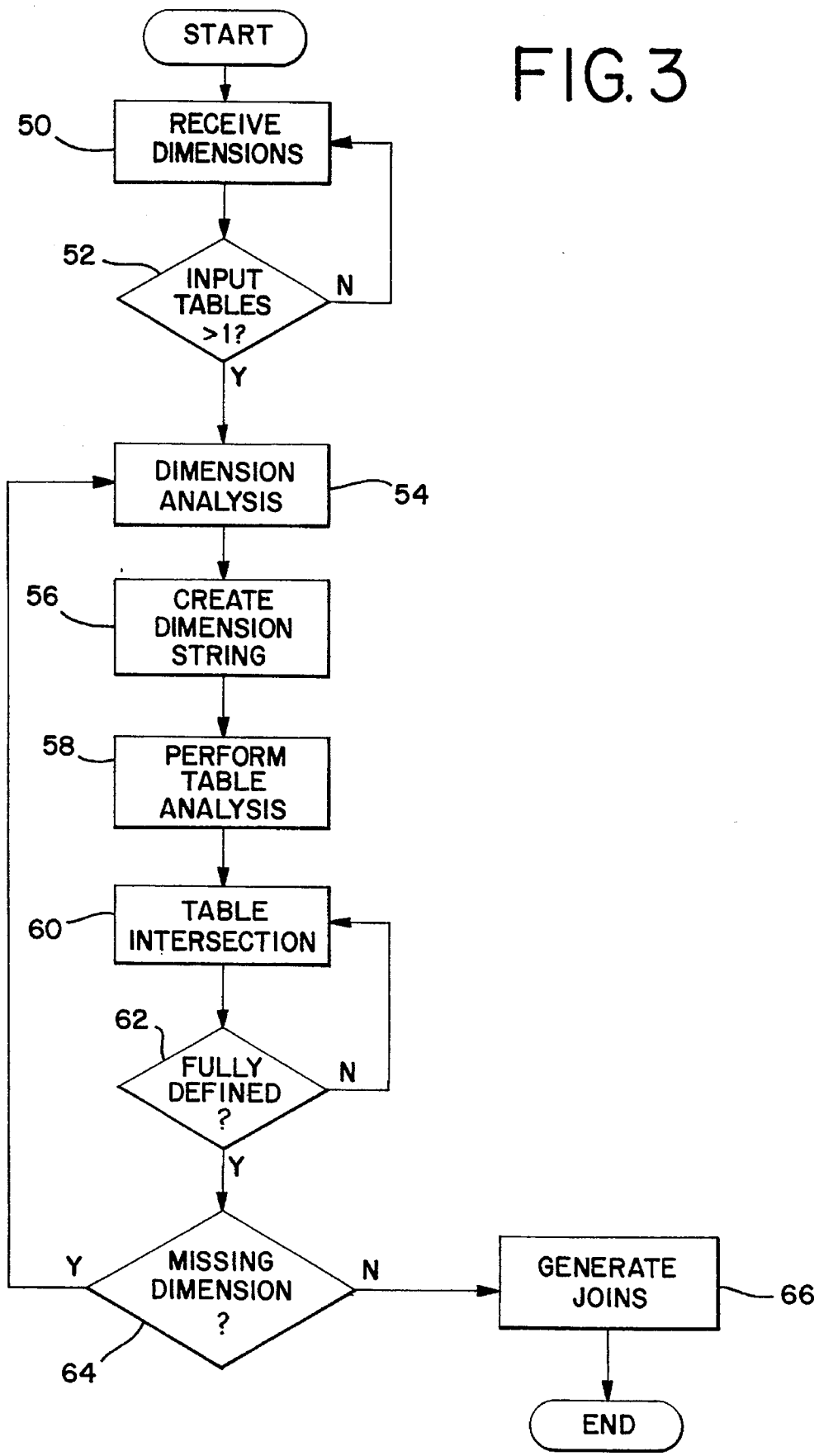
FIG. 3 is a more detailed flow chart of the table selection routine shown in FIG. 2.

A more detailed illustration of the steps involved in the preferred table selection routine appears in FIG. 3. Once the user-supplied input dimensions for each query are received at step 50, the program checks to verify that input data tables representing the input dimensions have been identified at step 52. If the number of input data tables is not one or more, then proper user-supplied input dimensions have not been received by the system and the program loops back to step 50 and awaits further input. If more than one data table representing the input dimensions have been identified, then a valid query has been initiated by the user. Program flow then proceeds at step 54 for analysis of the input dimensions.

The outcome of the analysis of the input dimensions (step 54) is the creation of a dimension string at step 56 reflective of the user's query. Once the dimension string is created, table selection can begin at step 58. The routine then begins a process of determining the intersection of the data tables representing the user-supplied input dimensions at step 60.

In the preferred embodiment of the invention, the process of determining the intersection of the data tables is an iterative process. The program begins with the data tables reflective of the user-supplied input dimensions and then proceeds to identify or retrieve other data tables contained within the database to establish the relationship requested in the user's query. As a result, other data tables from the database can be retrieved or identified in the process of obtaining the ultimate output table containing an intersection of the input dimensions. In one preferred embodiment of the invention, an ideal intersection is sought employing the least number of data tables required to reflect the user's query.

It is important to note that the idea of an intersection of tables stems from the representation of input variables as dimensions in a multi-dimensional space. In the three-variable query discussed above, where each variable represents a dimension in a Cartesian coordinate system, the intersection of these dimensions can be readily expressed. Where more than three dimensions are supplied, the intersection of data tables can be shown as an intersection in n-dimensional space, where "n" represents the number of user-supplied input dimensions. (A more detailed illustration of the concept of multi-dimensional intersections is described below in connection with FIGS. 5 and 6.)

Referring again to FIG. 3, in the course of determining the intersection of the input dimensions, the program continually checks the developing output table to determine if the output table is fully defined. A fully defined output table, in one preferred embodiment of the invention, contains the minimum number of data tables required to implement the user's query. The program checks to determine if the output table is fully defined at step 62.

If the output table does not currently contain an intersection of data tables reflecting the query, the program determines whether other missing dimensions are necessary at step 64. Missing dimensions in the form of missing data tables are then incorporated or pulled in by the program to complete the output table containing the intersection. Once the table selection process is complete and an output table representative of the intersection of user-supplied input dimensions is identified, the program proceeds at step 66 to create the necessary SQL Join statements identifying the relationship between input dimensions and the output table. At step 66, therefore, the program proceeds to invoke the link logic subroutine employed in one presently preferred embodiment of the invention.

Figure 4:
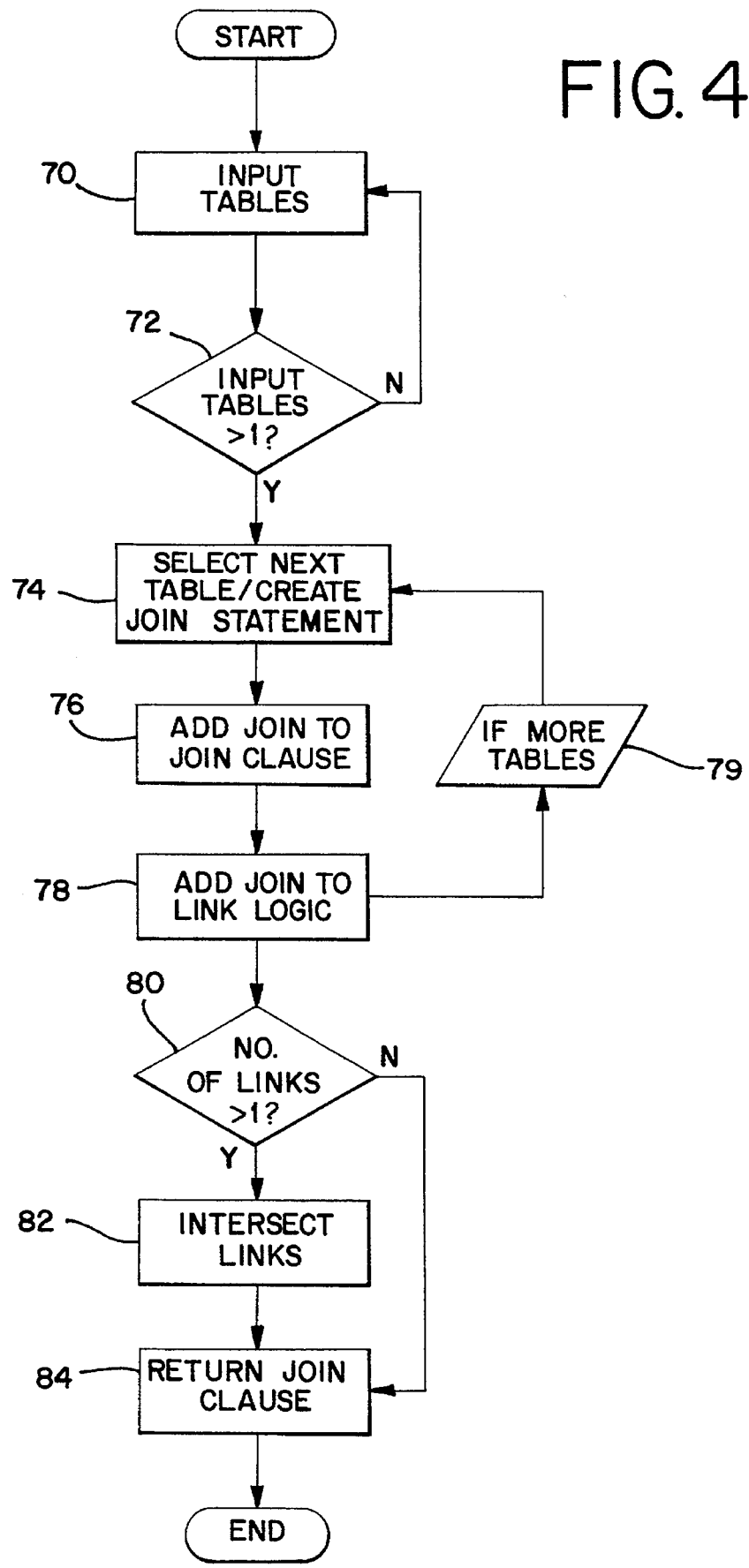
FIG. 4 is a more detailed flow chart of the link routine shown in FIG. 2.

The preferred flow of the link logic routine is shown in FIG. 4. The link logic routine begins at step 70, where the input tables are received. Program flow proceeds to step 72 to determine if the number of input tables are greater than one, i.e., that valid tables have been received. If so, the routine proceeds to step 74; if not, the flow loops back to step 70 to await further input tables.

At step 74, the link logic routine identifies the links associated with each input table, and at step 76, the routine stores the identified links. The links identify what data is common between separate data tables. Once the link is identified, the routine creates the necessary Join statement to express the link as an SQL instruction. The routine proceeds at step 76 to add each Join statement to the developing Join clause as the routine tests each of the input data tables. At step 78, the Join statement is incorporated into the link logic routine. As shown at step 79, this process is repeated for each of the input tables.

The routine tests the composite list of links at step 80 to determine if the query has requested a trivial solution. If only one link has been identified, then the solution is trivial, and the routine proceeds to step 84. If more than one link has been identified, the link logic routine proceeds to intersect the links at step 82. Upon completion of the intersection, the routine returns the complete Join clause to the main program at step 84.

A presently preferred embodiment of the user interface for the invention is shown in FIG. 5. Referring first to FIG. 5(a), a Cartesian coordinate user interface or "front-end" is generally shown at 100. As discussed above, a Cartesian coordinate user interface has a number of advantages. For example, such a geometric representation enables the visual communication of information in a manner most users are familiar with and, more importantly, are comfortable with. Further, a Cartesian coordinate front-end can display a substantial amount of information on a display screen without appearing cumbersome or congested. As a result, for queries with three or more input dimensions, the front-end remains simple and can communicate the large amount of information required for the query (see FIG. 6(a)).

Figure 5A:
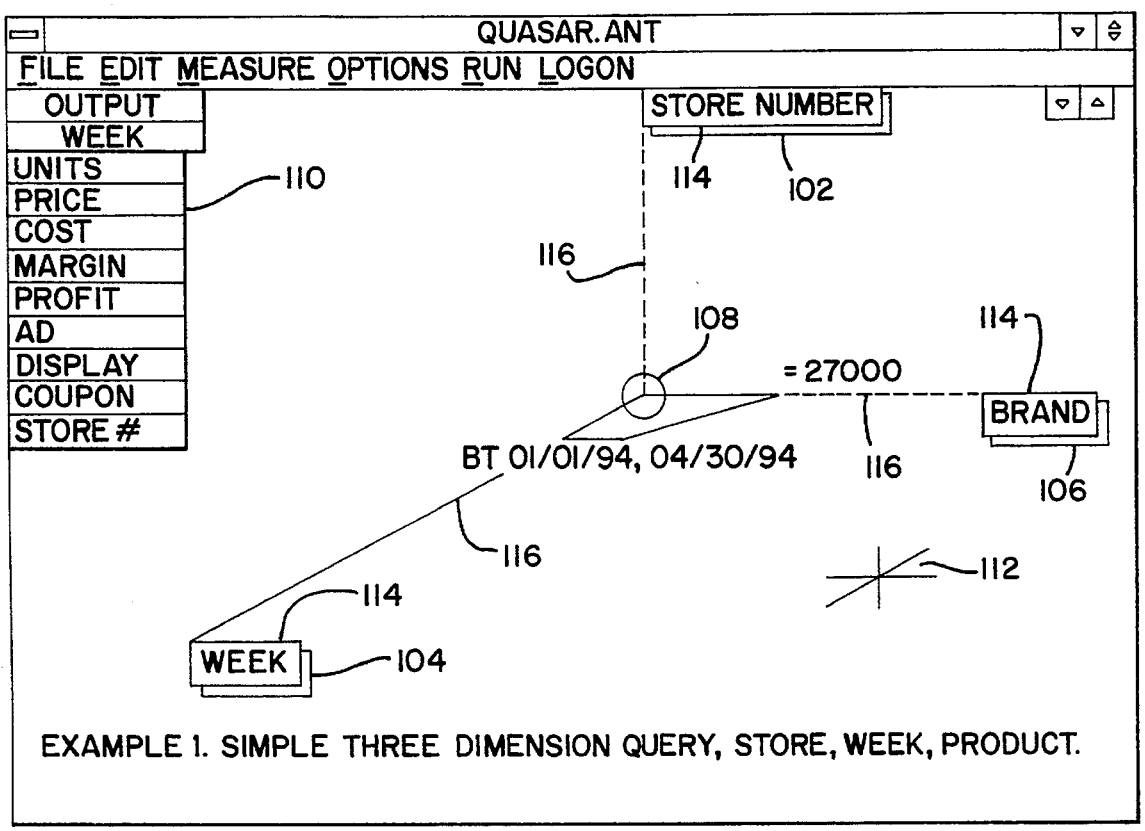
FIG. 5(a) is a Cartesian coordinate display showing input dimensions provided by the user.

An example of a three-dimensional query employing the invention is shown in FIG. 5(a). In the example, three dimensions 102, 104, 106 are supplied by a user in order to query a relational database. In FIG. 5(a), the three user-supplied input dimensions represent Store Number, Week and Brand of product. This type of query, therefore, may look for the number of brand products sold in a week for a particular store or group of stores.

The Cartesian coordinate system of the display visually identifies the outcome of the search as the hypothetical intersection 108 of the three input dimensions. An axis control icon 112 is used to select an axis for defining an input dimension or to constrain a dimension. Clicking on the dimension boxes 114 allows a user to add or delete a dimension. Clicking on an axis 116 allows the user to constrain the dimension associated with that axis.

In one presently preferred embodiment of the invention, the Cartesian coordinate front-end is produced in a windows-type display on the personal computer 14. Thus, in the preferred embodiment a version of Microsoft Corporation's Windows operating system is preferably stored and executing on the personal computer 14. As those skilled in the art will appreciate, many of the features provided through the Windows operating system, such as dialog boxes and pull-down menus, have been incorporated in the front-end of the user interface. These Windows features are generally known in the art, and need not be described in further detail herein.

The programs employed with the invention have, in the preferred embodiment, been written in the Toolbook language sold by Asymmetrics Corp. The Toolbook language allows programmers to design software programs for execution in Windows environments and is generally available in the market. In the preferred embodiment of the invention, the entire program has been written in the Toolbook language. Copies of the essential subroutines for table selection and link generation are reproduced herein in the Appendix. Other elements of the program containing general routines for communication with the various peripherals of the system and the database employ generally known techniques. Accordingly, these aspects of the program need not be addressed in further detail herein.

In the preferred embodiment of the invention, software drivers are created to represent the data tables stored in the relational database. A dimension driver is created, therefore, to allow a user to select as input dimensions those data tables that currently exist in the database. The dimension driver forms the representation of the data tables and is stored in memory on the personal computer 14. In alternate embodiments of the invention, constraints and functions are also provided for operation on the input dimensions. Preferably the constraints are directly loaded from the database so that a user can only select valid constraints as inputs. Input dimensions, constraints and functions, are also preferably presented to the user in the form of pull-down menus 110 or dialog boxes (not shown) in a manner generally known in the art.

Figure 5B:
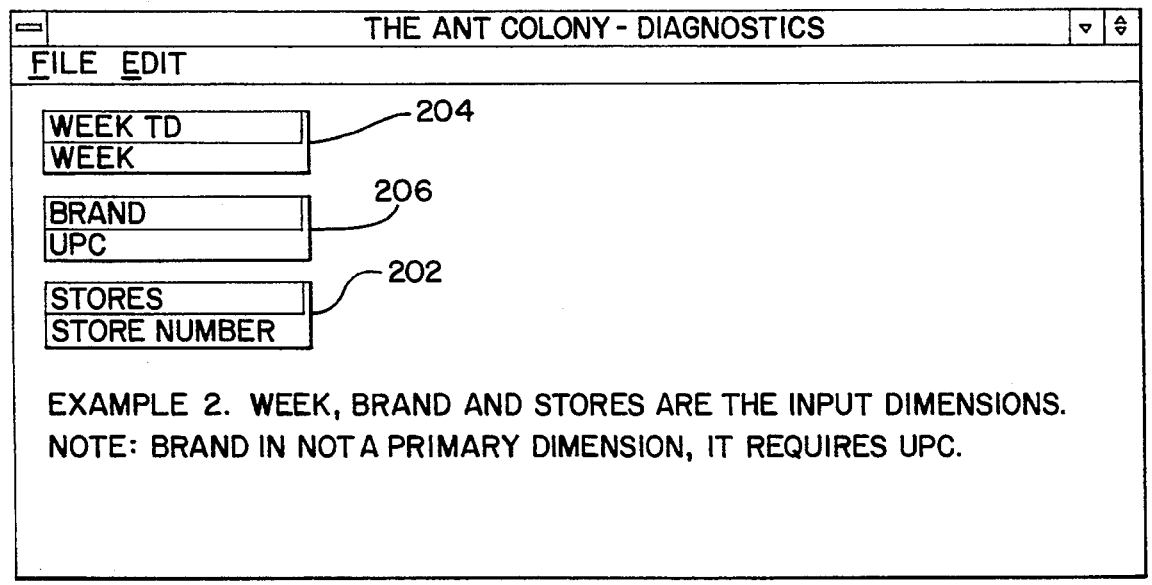
FIG. 5(b) is an illustration of data tables representing the input dimensions provided by the user.

Once the user-supplied input dimensions have been received by the system, the program identifies a subset of data tables from the database corresponding to the input dimensions. In a preferred embodiment of the invention, the data tables are presented to the user on a display, as shown in FIG. 5(b). In the above example, data tables for a store number 202, brand product 206 and week 204 are shown. Once the data tables 202, 204, 206 corresponding to the input dimensions have been identified, the program proceeds as described above to select an output table representative of the intersection of these data tables 202, 204, 206. In one preferred embodiment of the invention shown in FIG. 5(c), the output table 210 is also presented to the user.

Figure 5C:
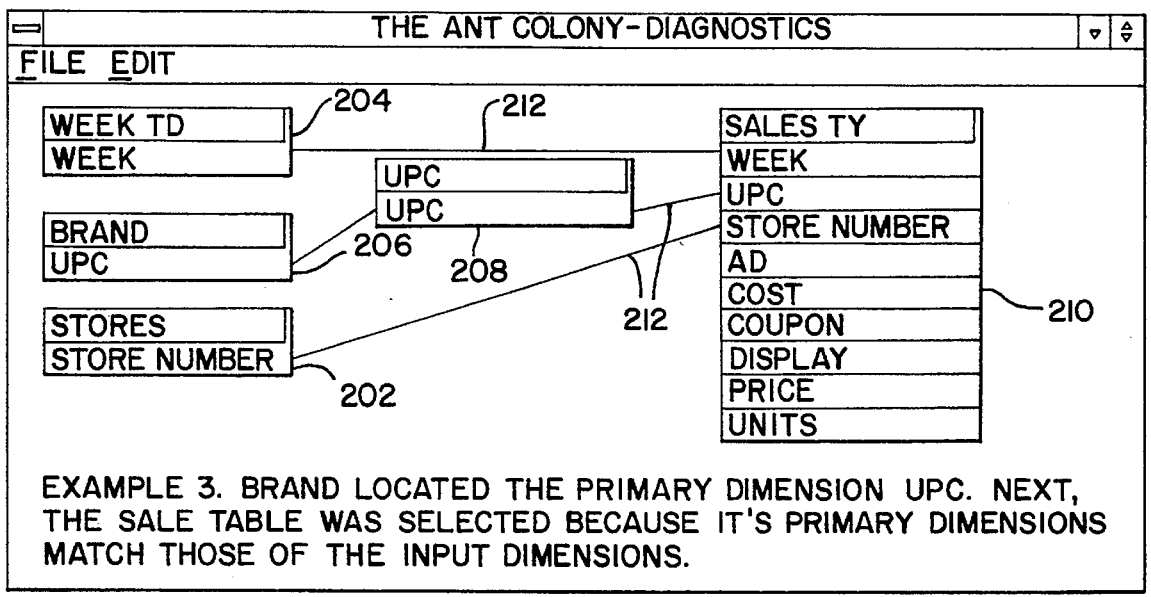
FIG. 5(c) is an illustration of the links generated between the input data tables and the selected table.
Figure 5D:
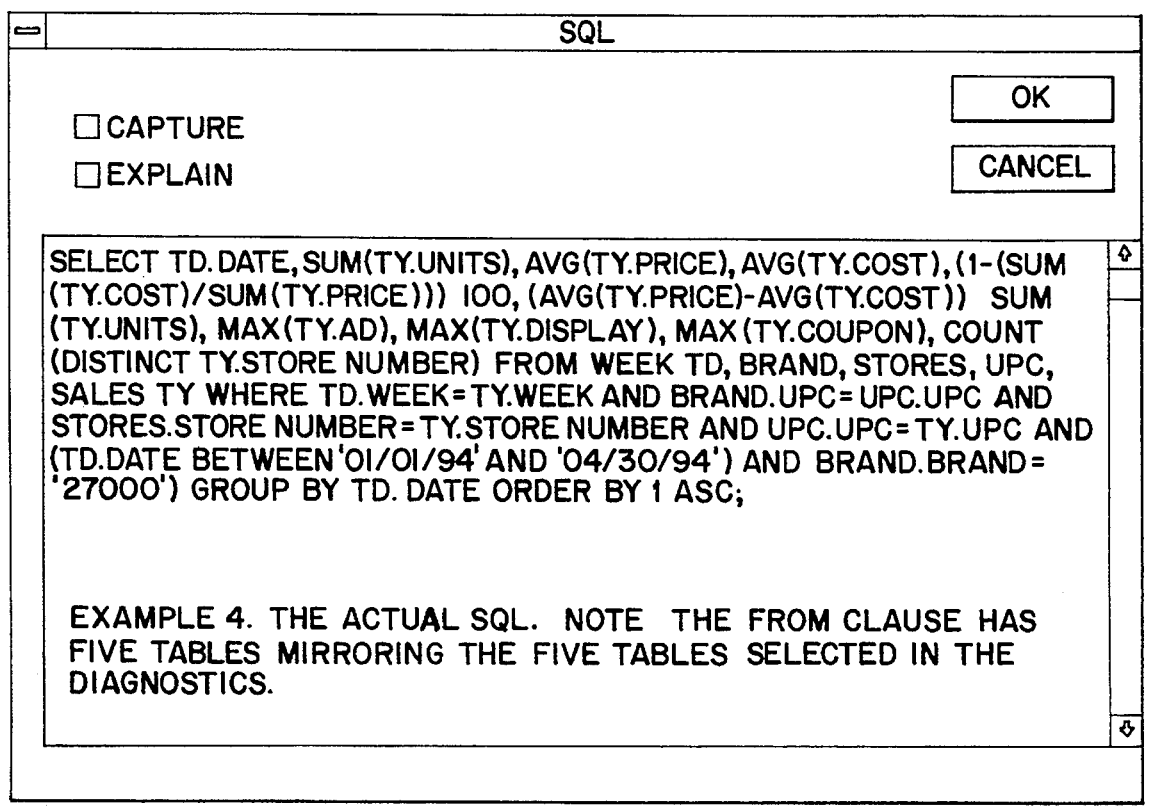
FIG. 5(d) is a printout of the SQL statements generated in response to the input dimensions.

Referring to FIG. 5(c), one or more links 212 are shown connecting the dimensions specified in the data tables to the output table 210. As can be seen, data contained in the input data tables is directly linked to corresponding data in the output table 210. The links 212 shown in FIG. 5(c) are thus a visual representation of the SQL Join statement to be generated by the program. Also shown in FIG. 5(c) is an intermediate data table 208, which may be retrieved by the system in the process of developing the ultimate output table 210.

Once the output table 210 has been selected, the program automatically generates the series of SQL instructions needed to communicate the user's query to the database. For the example discussed above, a series of SQL instructions reflecting the output table 210 and links 212 shown in FIG. 5(c) is reproduced in FIG. 5(d). Again, as those skilled in the art will appreciate, the SQL instructions are presented in FIG. 5(d) as a window appearing on the display of the personal computer 14 (FIG. 1).

Figure 6C:
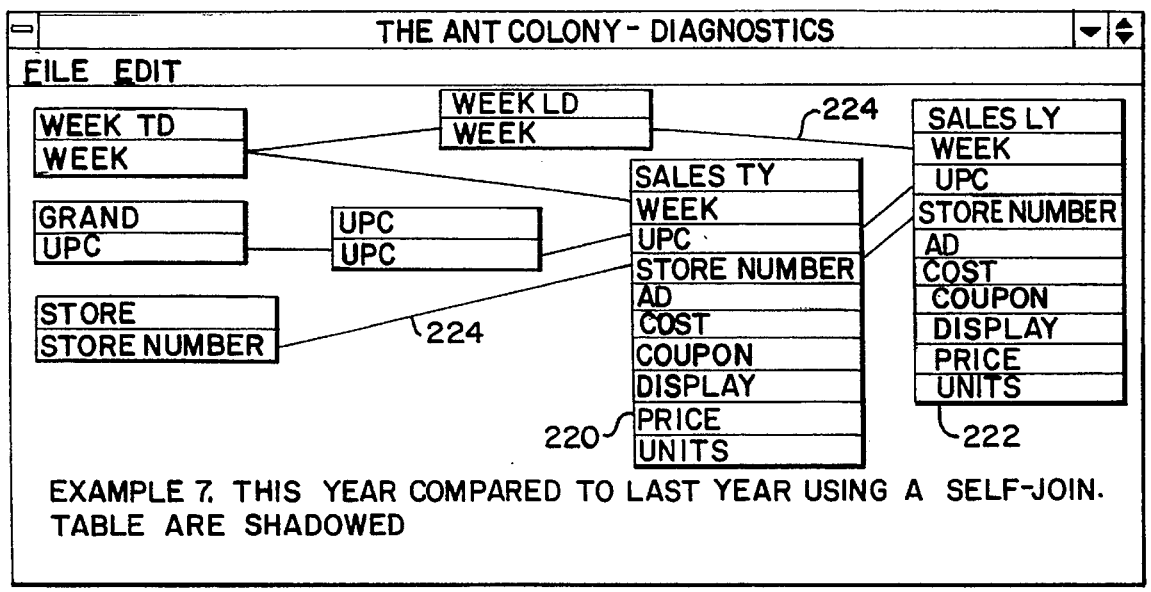
FIG. 6(c) is an illustration showing the linked data tables.
Figure 6D:
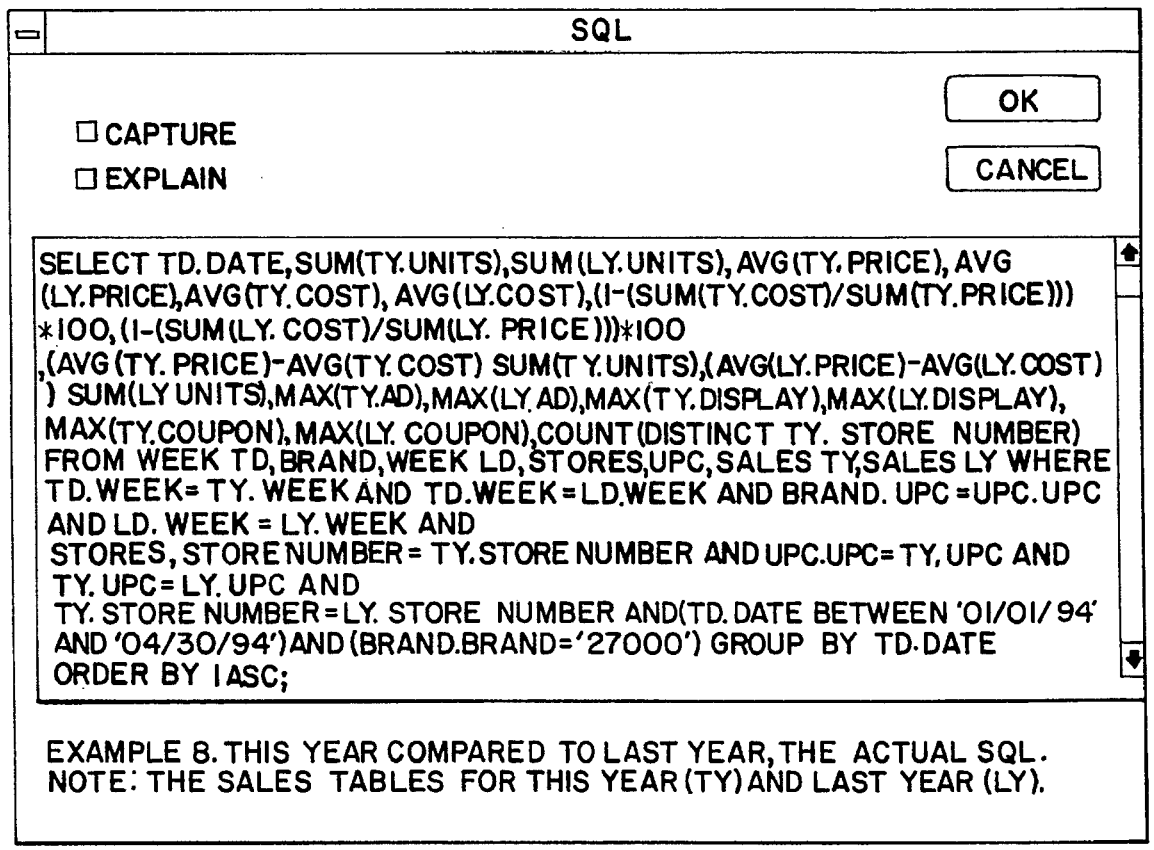
FIG. 6(d) is a printout of the SQL statements for this example.

More complex inquiries are readily configurable using the preferred user interface of the invention. Referring to FIG. 6, a further example incorporating a fourth input dimension is shown. In the example, the user has requested a benchmark of comparison for the data requested in the above example. As shown in FIG. 6(a), the benchmark input dimension is a comparison to last year's data 214. Data tables corresponding to the four input dimensions (Week 204, Brand 206, Store Number 202 and Last Year's week 216) are displayed to the user, as shown in FIG. 6(b). Finally, two output tables 220, 222 are shown in FIG. 6(c), which were identified by the table selection process. As discussed above, links 224 are provided between the data tables corresponding to the input dimensions and the output tables 220, 222. As shown in FIG. 6(c), the output tables 220, 222 correspond to sales tables containing this year's and last year's data of the information requested by the user. The series of SQL instructions generated for this example is shown in FIG. 6(d).

Because the output of the program is a text string, the actual process of submitting an SQL statement and placing the results, is an open module. As a result, the user/developer has complete control over the output format and placement of the query. For example, the text string output SQL instructions can be coupled directly to commercially available spreadsheet programs such as Excel, sold by Microsoft Corporation.

As mentioned above, the presently preferred program runs on one or more driver routines. A detailed discussion of the presently preferred driver tables, and their purposes and contents, is provided below. Preferably, only a minimum amount of information is required to represent the query so that significant amounts of memory are-not required for the interface.

One advantage of the invention is the ability to save previously executed queries. Another advantage of the preferred system is that if the tables and views do not change, the only maintenance required of the system is adding new facts and functions. In this embodiment, any query can be saved and employed again in the future. As such, any query can be saved and executed using only the SQL generator aspect of the system.

In one preferred embodiment of the invention, a user preferably accesses the program and executes a query by "double-clicking" on an icon projected on the user's display, which identifies the program. Such program initiation is generally known in the art and need not be discussed in detail herein.

Driver routines contain information about what dimensions and facts are available on the database, where the data is located, and default Join statements. Preferably, each driver routine contains four tables: Dimension, Facts, Function and Joins. In a preferred embodiment of the invention all of the driver tables are maintained and updated in generally available software such as Excel.

A more detailed description of the presently preferred driver tables will be useful to understand the operation of the invention. As mentioned above, four driver tables are provided in a preferred embodiment of the invention. The Dimension table is used to control which input selections are available to the user. Thus, the user can only select dimensions identified in the Dimension table, which represent the data tables stored in the database. The Dimension table, therefore, includes several columns such as a table or view name for each dimension, as well as a column name for each dimension. All searches and constraints will be performed with this table name and column name.

Other columns can include a description column, where a list of available dimensions are stored when a user selects an axis from the user interface (see FIGS. 5 and 6). Optional columns can also be included, as those skilled in the art will appreciate, for default formats or mandatory "Where" clauses. A sort column, used when populating a dialogue box, is also optionally available.

Each row in the Dimension table thus contains information about a dimension in the database. To add a new dimension, the user simply adds another row to this table. Similarly, to change an existing dimension, the user or administrator can simply edit the table.

A Function table is provided to control what selections are available to the user. The user can only select functions defined in this table. The Function table preferably consists of a fact column listing all of the facts available to the user. A dimensions column is also provided, which includes a name for a particular fact, where all searches and constraints will be performed for this column. In one preferred embodiment of the invention, the dimension column may contain multiple columns if a function template (described below) requires multiple facts.

Optional columns for the Function table include a function template or the assembly instructions for a function. The function template and database columns names are stored separately. A default format column is also optionally available in the Function table. A where column is also optionally available, which is used to add a Where clause to an element in the function.

In the preferred embodiment of the invention, the user can select a fact (no function template) from a fact menu option and perform an aggregation operator on the fact, i.e., SUM, MAX, MIN, etc. When the program generates an SQL statement, it checks each fact to confirm that it is valid in the desired set of dimensions. If the fact/function is valid for the be added into the SQL statement for communication to the database.

Preferably, the function template is straightforward. Numbers in the template are provided, which correspond to column names in the dimension column. The program preferably checks to see that all column names exist in a single table that has been selected from the set of desired dimensions. If all column names exist within the selected tables, the program will assemble the function using the function template, the predefined columns and the inferred table.

The Facts table is used to check whether the selected fact/function is valid. The Facts table, therefore, should consist of every column (dimensions and facts) from every table available in this driver. The Facts table should also include all table aliases. The Facts table preferably includes only one column, which contains the full table (actual name or alias) and column name.

Finally, the Joins table has two purposes. First, the Joins table facilitates the mathematical table selection process. Second, the Joins table functions to join the actual tables. All default Joins must be included in this table. The Joins table consists of several columns such as table and column combinations for source and destination tables. Other columns containing the table or alias name are provided, which are used during table selection. The same holds true for column columns.

The Joins table preferably has each join defined bi-directionally (i.e., A=B and B=A). In one preferred embodiment of the invention, the system will actually infer a table, test a table and run the join backwards to make sure the join is complete and correct. As those skilled in the art will appreciate, correct. As those skilled in the art will appreciate, however, no order of preference of dimensions is required to be sent to the SQL generator. Any order of dimensions will, therefore, produce the same results on the preferred system.

The system described provides a number of advantages over preexisting SQL generators. In addition to the automatic generation of SQL instructions, the system allows a lay user to easily update and modify queries of a relational database. The updates and modifications, as well as preexisting queries, are directly communicated to the system. As described above, the system then automatically selects the proper tables reflective of the user's query, and generates the necessary SQL instructions from the selected table. The system, therefore, greatly reduces the amount of time before the user can receive results to his or her query. The system also reduces the overhead costs previously involved in directly programming and selecting the proper tables reflective of a user's input.

Other features and advantages of the system include dynamic generation of the output tables and links to the input data tables, which require a minimum amount of memory. A visual representation is also provided that simply and efficiently communicates the user's input, the output table selected and any links therebetween, to the user. A technique is also provided, which identifies the minimum number of tables reflective of the user's query. The technique can also include a mechanism for bi-directionally checking each link to ensure the integrity of the table selection process.

It is to be understood that a wide range of changes and modifications to the embodiments described above will be apparent to those skilled in the art, and are also contemplated. It is, therefore, intended that the foregoing detailed description be regarded as illustrative rather than limiting, and that it be understood that it is the following claims, including all equivalents, that are intended to define the spirit and scope of the invention.

```
to get tableSelection antTables system tableNumber
    system sqlDiagnostics
    system uniqueDimensions set table         to NULL
    set tablesInProcess to NULL
    set tablesInStorage to NULL -- generate a list of unique table names
    set uniqueTables to NULL
    set uniqueNumber to 0 set uniqueDimensions     to NULL
    set uniqueDimensionsNumber to 0 if sqlDiagnostics
        --get setGlobalVar("antTables",uniqueItemsLines(antTables))
        set cmd to "system antTables;set antTables to"&"e&&replace(uniqueItemsLines(antTables),crlf,""""&crlf&"""")"e
        executeRemote "system antTables;set antTables to"&"e&replace(uniqueItemsLines(antTables),crlf,""""&crlf&"""")"e application toolbook topic "ant_diag.tbk"
        executeRemote "send drawTable" application toolbook topic "ant_diag.tbk"
    end if set uniqueTables to uniqueItemsLines(antTables)
    set uniqueNumber to textLineCount(uniqueTables)
    set historyTables to uniqueTables if uniqueNumber = 1
        -- single table query, no selection is necessary
    else set continueTableAnalysis to true set nextPass to TRUE
        while nextPass
            set nextPass to FALSE
            -- first pass looks for directionals
            -- second pass looks for second order relationships
            step i from 1 to uniqueNumber set OK to TRUE
                while OK
                    set OK to FALSE
                    set table to (textLine i of uniqueTables)
                    if testDimension(textLine i of uniqueTables)

set tempInProcess to (tableAnalysis(textLine i of uniqueTables,false))

if textLine 1 of tempInProcess is NOT NULL
                            -- delete tables previously analysized
                            set textLine i of tablesInProcess to (textLine 2 of tablesIntersection(textLine 1 of tempInProcess,textLine i of historyTables))
                            set tablesReturned         to itemCount(textLine i of tablesInProcess)

if tablesReturned > 0
                                -- test for first-order joins
                                set tempInProcess to textLine 1 of tablesIntersection(textLine i of tablesInProcess,antTables)  -- switched from uniqueTables) to antTables on 11/3/93
                                -- maybe a problem here if muntiple dimensions are found
                                -- for NOW assume only one.  10/20/93
```

```
if textLine 1 of tempInProcess is NOT NULL
    -- check for self join, CANNOT compress dimensions on self joins
    if (word 1 of textLine i of uniqueTables) <> (word 1 of tempInProcess)
        -- first order linear join
        -- replace uniqueTables with new table
        set textLine i of uniqueTables to (item 1 of tempInProcess)
        set textLine i of historyTables to (textLine i of historyTables)&","&(item 1 of tempInProcess)
    end if
else -- test for non-dimensions
    set tempInProcess to (textLine 1 of tableAnalysis(textLine i of uniqueTables))

if itemCount(tempInProcess)=1
        -- single-dimension end-point
        if testDimension(item 1 of tempInProcess)
            -- required table add table to tables and antTables.
            -- do NOT add a data (non-dimension table)
            set antTables    to antTables&crlf&(item 1 of tempInProcess)
            set tableNumber to tableNumber+1

-- replace uniqueTables with new table
            set textLine i of uniqueTables to (item 1 of tempInProcess)
            set textLine i of historyTables to (textLine i of historyTables)&","&(item 1 of tempInProcess)

set OK to TRUE
        end if
    else
        -- dimension has access to non-dimension tables
        -- test each dimension for second-order linear joins
        step j from 1 to itemCount(textLine i of tablesInProcess)

-- test for dimension
            set tempInProcess to (textLine 1 of tableAnalysis(item j of textLine i of tablesInProcess,false))

-- test for match
            set testInProcess to tablesIntersection(uniqueTables,tempInProcess)

if (textLine 1 of testInProcess) is NOT NULL
                if itemCount(textLine 1 of testInProcess) = 1

-- check for self join, CANNOT compress dimensions on self joins
                    if (word 1 of textLine i of uniqueTables) <> (word 1 of item 1 of textLine i of tablesInProcess)

-- required table add table to tables and antTables.
                        set antTables    to antTables&crlf&(item 1 of textLine i of tablesInProcess)
                        set tableNumber to tableNumber+1

-- replace uniqueTables with new table
                        set textLine i of uniqueTables to (item 1 of textLine 1 of testInProcess)
                        set textLine i of historyTables to (textLine i of historyTables)&","&(item 1 of textLine 1 of testInProcess)

set OK to TRUE
                    end if
                end if
            end if
        end step
    end if
end if
```

```
                    end if
                end if
                if OK
                    -- force a second pass
                    set nextPass to TRUE
                end if
            end if
        end while
    end step
end while -- create unique Dimension string
set uniqueDimensions    to uniqueItemsLines(uniqueTables)
set uniqueDimensionsNumber to textLineCount(uniqueDimensions)

-- reinitialize tablesInProcess 12/21/92
set tablesInProcess to NULL
step i from 1 to uniqueDimensionsNumber
    set textLine i of tablesInProcess to (textLine 1 of tableAnalysis(textLine i of uniqueDimensions,true))
end step if sqlDiagnostics
    --get setGlobalVar("antTables",uniqueItemsLines(antTables))
    executeRemote "system antTables;set antTables to"&"e&replace(uniqueItemsLines(antTables),crlf,""""&crlf&"""")"e application toolbook topic "ant_diag.tbk"
    executeRemote "send drawTable" application toolbook topic "ant_diag.tbk"
end if if uniqueDimensionsNumber > 1
    --multidimensional query -- test for first Order Joins
    set testTables to NULL
--  step i from 1 to uniqueDimensionsNumber -- 12/21/92uniqueNumber
--      if testTables is NULL
--          set testTables to (item i of uniqueDimensions)
--      else
--          set testTables to tablesIntersection(textLine 1 of testTables,textLine i of tablesInProcess)
--      end if
--  end step if (textLine 1 of testTables) is NULL set minimumTables to NULL,NULL
        --step i from 1 to uniqueDimensionsNumber -- 12/21/92uniqueNumber
        --    set tablesReturned to itemCount(textLine i of tablesInProcess)
        --    if i = 1
        --        -- first one
        --        set minimumTables to tablesReturned,i
        --    else
        --        if tablesReturned<(item 1 of minimumTables)
        --            set minimumTables to tablesReturned,i
        --        end if
        --    end if
        --end step set i           to (item 2 of minimumTables)
        set tablesReturned to (item 1 of minimumTables)

--set foundATable to false
```

```
step i from 1 to uniqueDimensionsNumber
    set tablesReturned to itemCount(textLine i of tablesInProcess)
    set minimumTables to tablesReturned,i
    step j from 1 to (item 1 of minimumTables)

set table          to (item j of textLine i of tablesInProcess)
        set testDimensions to tableAnalysis(item j of textLine i of tablesInProcess)

set testColumns    to (textLine 2 of testDimensions)
        set testDimensions to (textLine 1 of testDimensions)
        set matchedDimensions to tablesIntersection(uniqueDimensions,testDimensions)

if textLine 2 of matchedDimensions is NULL
            set fullyDefined to tablesIntersection(testDimensions,uniqueDimensions)

set tableOK    to fullyDefined(fullyDefined,testColumns)
            -- under development 6/23/93 fullyDefined(table,fullyDefined)

if tableOK
                set antTables   to antTables&crlf&table
                set tableNumber to tableNumber+1
                set i           to uniqueDimensionsNumber
                if sqlDiagnostics
                    --get setGlobalVar("antTables",uniqueItemsLines(antTables))
                    executeRemote "system antTables;set antTables to"&"e&replace(uniqueItemsLines(antTables),crlf,""""&crlf&"""")"e application toolbook topic "ant_diag.tbk"
                    executeRemote "send drawTable" application toolbook topic "ant_diag.tbk"
                end if
            end if
        else
            set fullyDefined to tablesIntersection(testDimensions,uniqueDimensions)

set tableOK    to fullyDefined(fullyDefined,testColumns)
            -- under development 6/23/93 fullyDefined(table,fullyDefined)

if tableOK
                set textLine i of tablesInProcess to (textLine 1 of tableAnalysis(item j of textLine i of tablesInProcess))
                set missedDimensionsNumber    to itemCount(textLine 4 of matchedDimensions)
                step k from 1 to missedDimensionsNumber
                    set currentDimension       to (item k of textLine 2 of matchedDimensions)
                    set currentDimensionNumber to (item k of textLine 4 of matchedDimensions)
                    set matchedTables          to tablesIntersection(textLine currentDimensionNumber of tablesInProcess,textLine i of tablesInProcess)
                    if textLine 1 of matchedTables is NOT NULL
                        set matchedTableNumber to itemCount(textLine 1 of matchedTables)
                        step l from 1 to matchedTableNumber
                            set testDimensions to dimensionAnalysis(item 1 of textLine 1 of matchedTables)
                            set testColumns    to (textLine 2 of testDimensions)
                            set testDimensions to (textLine 1 of testDimensions)
                            set matchedDimensions2 to tablesIntersection(uniqueDimensions,testDimensions)
                            set fullyDefined to tablesIntersection(testDimensions,uniqueDimensions)

set tableOK    to fullyDefined(fullyDefined,testColumns)
                            -- under development 6/23/93 fullyDefined(table,fullyDefined)
                            if tableOK
                                set antTables   to antTables&crlf&table
                                set tableNumber to tableNumber+1
                                set antTables   to antTables&crlf&(item 1 of textLine 1 of matchedTables)
                                set tableNumber to tableNumber+1
                                set i           to uniqueDimensionsNumber
```

```
                            if sqlDiagnostics
                                --get setGlobalVar("antTables",uniqueItemsLines(antTables))
                                executeRemote "system antTables;set antTables to"&"e&replace(uniqueItemsLines(antTables),crlf,""""&crlf&"""")"e application toolbook topic "ant_diag.tbk"
                                executeRemote "send drawTable" application toolbook topic "ant_diag.tbk"
                            end if
                        end if
                    end step
                else
                    set missedTableNumber to itemCount(textLine currentDimensionNumber of tablesInProcess)
                    step l from 1 to missedTableNumber
                        -- deactivated 10/19/93
                        --set testDimensions   to dimensionAnalysis(item l of textLine currentDimensionNumber of tablesInProcess)
                        --set testColumns      to (textLine 2 of testDimensions)
                        --set testDimensions   to (textLine 1 of testDimensions)

set matchedDimensions2 to tablesIntersection(textLine 2 of fullyDefined,item l of textLine currentDimensionNumber of tablesInProcess) --testDimensions)
                        if textLine 1 of matchedDimensions2 is NOT NULL
                            set antTables     to antTables&crlf&(item l of textLine currentDimensionNumber of tablesInProcess)
                            set tableNumber   to tableNumber+1
                            set addTableNumber to itemCount(textLine 1 of matchedDimensions2)
                            set i             to uniqueDimensionsNumber
                            if sqlDiagnostics
                                --get setGlobalVar("antTables",uniqueItemsLines(antTables))
                                executeRemote "system antTables;set antTables to"&"e&replace(uniqueItemsLines(antTables),crlf,""""&crlf&"""")"e application toolbook topic "ant_diag.tbk"
                                executeRemote "send drawTable" application toolbook topic "ant_diag.tbk"
                            end if
                            step m from 1 to addTableNumber
                                set antTables    to antTables&crlf&(item m of textLine 1 of matchedDimensions2)
                                set tableNumber  to tableNumber+1
                                if sqlDiagnostics
                                    --get setGlobalVar("antTables",uniqueItemsLines(antTables))
                                    executeRemote "system antTables;set antTables to"&"e&replace(uniqueItemsLines(antTables),crlf,""""&crlf&"""")"e application toolbook topic "ant_diag.tbk"
                                    executeRemote "send drawTable" application toolbook topic "ant_diag.tbk"
                                end if
                            end step
                            if addTableNumber = 1
                                -- single dimension transition
                                set textLine currentDimensionNumber of uniqueDimensions to (item 1 of textLine 1 of matchedDimensions2)
                                set textLine currentDimensionNumber of tablesInProcess to tableAnalysis(textLine currentDimensionNumber of uniqueDimensions,false)
                            end if
                        end if
                    end step
                end if
                if sqlDiagnostics
                    --get setGlobalVar("antTables",uniqueItemsLines(antTables))
                    executeRemote "system antTables;set antTables to"&"e&replace(uniqueItemsLines(antTables),crlf,""""&crlf&"""")"e application toolbook topic "ant_diag.tbk"
                    executeRemote "send drawTable" application toolbook topic "ant_diag.tbk"
                end if
            end step
        end if
        if sqlDiagnostics
            --get setGlobalVar("antTables",uniqueItemsLines(antTables))
            executeRemote "system antTables;set antTables to"&"e&replace(uniqueItemsLines(antTables),crlf,""""&crlf&"""")"e application toolbook topic "ant_diag.tbk"
            executeRemote "send drawTable" application toolbook topic "ant_diag.tbk"
        end if
    end if
    end step
end step
```

```
            end if
        end if
    end if if sqlDiagnostics
        --get setGlobalVar("antTables",uniqueItemsLines(antTables))
        executeRemote "system antTables;set antTables to"&"e&replace(uniqueItemsLines(antTables),crlf,""""&crlf&"""")"e application toolbook topic "ant_diag.tbk"
        executeRemote "send drawTable" application toolbook topic "ant_diag.tbk"
    end if -- sort selected tables
    --   set antTables to uniqueItemsLines(antTables)

return antTables end tableSelection
```

```
to get fullyDefined temp1,temp2 set numberTables to itemCount(textLine 1 of temp1)
    set numberMissed to itemCount(textLine 2 of temp1)

if (textLine 2 of temp1) is NULL
        --OK
        set OK to true
        return OK
    end if set OK to false
    step i from 1 to numberMissed
        -- get missing tables, get the column name add test if it is satisifies from another table
        set table to (item i of textLine 2 of temp1)

set columnsInProcess to getJoinColumn(table)
        set foundIt to false
        step j from 1 to numberTables
            set testcolumns to getJoinColumn(item j of textLine 1 of temp1)
            set columnsReturned to itemCount(columnsInProcess)
            step k from 1 to columnsReturned
                if (item k of columnsInProcess) is IN testColumns
                    -- found it stop
                    set foundIt to true
                    set j to numberTables
                end if
            end step
        end step
        if foundIt
            set OK to true
        else
            set i to numberMissed
            set OK to false
        end if
    end step return OK end fullyDefined
``` to get generAntJoins antTables system dbName
system tableControl,tableNumber,illogicalJoin
system antHeader
  system sqlDiagnostics
  system uniqueDimensions if sqlDiagnostics
    -- reset column control parameters
    executeRemote "system drawLinkColumn1;set drawLinkColumn1 to 250,250"  application toolbook topic "ant_diag.tbk"
    executeRemote "system drawLinkColumn2;set drawLinkColumn2 to 2750,250"  application toolbook topic "ant_diag.tbk"
    executeRemote "system drawLinkColumn3;set drawLinkColumn3 to 5250,250"  application toolbook topic "ant_diag.tbk"
    executeRemote "system drawLinkColumn4;set drawLinkColumn4 to 7750,250"  application toolbook topic "ant_diag.tbk"
end if --system drawLinkColumn1
--system drawLinkColumn2
--system drawLinkColumn3
--system drawLinkColumn4

--set drawLinkColumn1 to 250,250
--set drawLinkColumn2 to 2750,250
--set drawLinkColumn3 to 5250,250
--set drawLinkColumn4 to 7750,250 set dbTable to (driverPath of this Book)&"joins.dbf"
set dbIndex to (driverPath of this Book)&"joins.ndx"

set uniqueTables to NULL
  set linkLogic   to NULL
  set linkNumber  to 0
  set linkTest    to NULL if openDBFile(dbTable) = 1
--successfully opened JOINS if openDBIndexFile(dbIndex) = 1
    --successfully Opened INDEX
      -- create unique table string
      set uniqueTables to uniqueItemsLines(antTables)
      set uniqueNumber to textLineCount(uniqueTables)

if (uniqueTables is NOT NULL) and uniqueNumber > 1
        set it to 0

--search each table for potential joins
        step i from 1 to uniqueNumber
          if word 2 of textLine i of uniqueTables is NOT NULL
            -- alias in use
            set table    to (word 1 of textLine i of uniqueTables)
            set tableAlias to (word 2 of textLine i of uniqueTables)
          else
            set table    to (textLine i of uniqueTables)
            set tableAlias to (textLine i of uniqueTables)
          end if if linkLogic is NULL
            set linkLogic to i

```
            set linkNumber to 1
    else
            set foundIt to false
            set numberOfLinks to textLineCount(linkLogic)
            step j from 1 to numberOfLinks
                    set linkTest to tablesIntersection(i, textLine j of linkLogic)
                    if textLine 1 of linkTest is NOT NULL
                            --set j to numberOfLinks+1
                            set linkNumber to j
                            --set textLine j of linkLogic to (textLine j of linkLogic)&","&i
                            set foundIt to true
                            set j to numberOfLinks
                    end if
            end step
            if NOT foundIt
                    set linkNumber to numberOfLinks+1
                    set linkLogic to linkLogic&crlf&i
            end if
    end if set IllogicalJoin to true
    set join      to NULL if selectDBIndexFile(dbIndex) = 1
            if findDBkey(tableAlias) <> 1 and findDBkey(tableAlias) <> 2
                    -- possible alias failure, check actual table
                    if findDBkey(table) <> 1 and findDBkey(table) <> 2
                            -- total failure
                            set listJoins to "ERROR and"&&listJoins
                            return -1
                    end if
            end if while (table = getDBFieldValue("table1") or tableAlias = getDBFieldValue("table1")) and it > -1
                    set table1 to tableAlias
                    set tmp   to getDBFieldValue("table2")
                    if (word 2 of tmp) is NOT NULL
                            -- Table Alias is in Use
                            set table2 to trim((word 2 of tmp))
                    else
                            -- No Alias
                            set table2 to trim((word 1 of tmp))
                    end if set column1  to trim(getDBFieldValue("column1"))
                    set optOpr1  to trim(getDBFieldValue("oprWhere1"))
                    set optWhere1 to trim(getDBFieldValue("where1"))
                    set column2  to trim(getDBFieldValue("column2"))
                    set optOpr2  to trim(getDBFieldValue("oprWhere2"))
                    set optWhere2 to trim(getDBFieldValue("where2"))
                    set optimize to getDBFieldValue("optimize")
                    set operator to getDBFieldValue("opr")

----------TEMP OPER
                    if operator is NULL
                            set operator to "="
                    end if if optWhere1 is NOT NULL
```

```
            set optWhere1 to optOpr1&&table1&"."&column1&&optWhere1
        end if
        if optWhere2 is NOT NULL
            set optWhere2 to optOpr2&&table2&"."&column2&&optWhere2
        end if
        set join    to NULL -- tables intersection was missing (v0000225,v0000013||v0000255 NA)
        set matchedJoins to tablesIntersection(uniqueTables,table2)
        ─────────────────────────────────────────
        if textLine 1 of matchedJoins is NOT NULL
            --table2 is in tables, create and test join
            if (optimizeJoins of this book) is NULL
                set optimizeJoins of this book to false
            end if if NOT optimize
                set join to dbName&table1&"."&column1&operator&dbName&table2&"."&column2
                if optWhere1 is NOT NULL
                    set join to join&&optWhere1
                end if
                if optWhere2 is NOT NULL
                    set join to join&&optWhere2
                end if
                if (optWhere1 is NOT NULL) or (optWhere2 is NOT NULL)
                    set join to "("&join&")"
                end if -- add link
                set textLine linkNumber of linkLogic to uniqueItemsLines((textLine linkNumber of linkLogic)&","&textLine 3 of matchedJoins)
                set illogicalJoin to false
            else
                if (optimizeJoins of this book)
                    -- Teradata Optimize
                    if table1 is IN uniqueDimensions and table2 is IN uniqueDimensions
                        set join to "(SUBSTR("&table1&"."&column1&",1,1)"&&"NOT
="&&"SUBSTR("&table2&"."&column2&",1,1)"&&"OR"&&"SUBSTR("&table1&"."&column1&",1,1)"&&"="&&"SUBSTR("&table2&"."&column2&",1,1))"
                    else
                        set join to NULL
                    end if
                end if
            end if if join is NOT in getGlobalVar("sqlJoins") and join is NOT NULL
                --Invert tables and check for link
                if NOT optimize
                    if operator = "<="
                        set oprTemp to ">="
                    end if
                    if operator = ">="
                        set oprTemp to "<="
                    end if
                    set join to dbName&table2&"."&column2&operator&dbName&table1&"."&column1
                    if optWhere2 is NOT NULL
                        set join to join&&optWhere2
                    end if
                    if optWhere1 is NOT NULL
                        set join to join&&optWhere1
                    end if
```

```
                    if (optWhere1 is NOT NULL) or (optWhere2 is NOT NULL)
                        set join to "("&join&")"
                    end if
                else
                    if (optimizeJoins of this book)
                        -- Teradata Optimize
                        --set join to "("&getDBfieldValue("TCTo")&&"NOT ="&&getDBfieldValue("TCFrom")&&"OR"&&getDBfieldValue("TCTo")&&"="&&getDBfieldValue("TCFrom")&")"
                        set join to "(SUBSTR("&table2&"."&column2&",1,1)"&&"NOT
="&&"SUBSTR("&table1&"."&column1&",1,1)"&&"OR"&&"SUBSTR("&table2&"."&column2&",1,1)"&&"="&&"SUBSTR("&table1&"."&column1&",1,1))"
                    end if
                end if
                if join is NOT in getGlobalVar("sqlJoins")
                    -- a new join
                    if NOT optimize
                        set join to dbName&table1&"."&column1&operator&dbName&table2&"."&column2
                        if optWhere1 is NOT NULL
                            set join to join&&optWhere1
                        end if
                        if optWhere2 is NOT NULL
                            set join to join&&optWhere2
                        end if
                        if (optWhere1 is NOT NULL) or (optWhere2 is NOT NULL)
                            set join to "("&join&")"
                        end if
                    else
                        if (optimizeJoins of this book)
                            -- Teradata Optimize
                            --set join to "("&getDBfieldValue("TCFrom")&&"NOT ="&&getDBfieldValue("TCTo")&&"OR"&&getDBfieldValue("TCFrom")&&"="&&getDBfieldValue("TCTo")&")"
                            set join to "(SUBSTR("&table1&"."&column1&",1,1)"&&"NOT
="&&"SUBSTR("&table2&"."&column2&",1,1)"&&"OR"&&"SUBSTR("&table1&"."&column1&",1,1)"&&"="&&"SUBSTR("&table2&"."&column2&",1,1))"
                        end if
                    end if
                    send appendGlobal "sqlJoins",join," and "
                    if sqlDiagnostics
                        --get setGlobalVar("antTables",uniqueItemsLines(antTables))
                        set cmd to "set text of field linkControl to (text of field linkControl)&""e&linkNumber&","&(textLine i of uniqueTables)&","&column1&","&operator&","&(textLine 1 of
matchedJoins)&","&column2&","&optimize"e&"&crlf"
                                executeRemote cmd application toolbook topic "ant_diag.tbk"
                                executeRemote "send addLink"   application toolbook topic "ant_diag.tbk"
                                executeRemote "send drawLinks" application toolbook topic "ant_diag.tbk"

--send drawLink linkNumber,table1,column1,operator,table2,column2,optimize
                                --send addLink linkNumber,(textLine i of uniqueTables),column1,operator,(textLine 1 of matchedJoins),column2,optimize
                                --send drawLinks
                        --    executeRemote "send drawTable"&&linkNumber&","&(textLine i of uniqueTables)&","&column1&","&operator&","&(textLine 1 of matchedJoins)&","&column2&","&optimize
application toolbook topic "ant_diag.tbk"
                        --    executeRemote "send drawLinks" application toolbook topic "ant_diag.tbk"
                    end if
                end if
            end if
        end if
    get nextDBKey()
    end while
    --reset EOF condition
    set it to 0
```

```
            else
                    --select index failure
            end if end step -- test for missing Joins set foundIt to false
        set numberOfLinks to textLineCount(linkLogic)
        while numberOfLinks > 1
            set linkMaster to (textLine 1 of linkLogic)
            set linkOK    to false
            step j from 2 to numberOfLinks
                set linkTest to tablesIntersection(textLine 1 of linkMaster, textLine j of linkLogic)
                if (textLine 1 of linkTest) is NOT NULL
                    --send appendGlobal "sqlJoins","ERROR in GenerANTJoin -- LINKLOGIC FAILURE!",""
                    set textLine 1 of linkLogic to uniqueItemsLines(textLine 1 of linkLogic&","&textLine j of linkLogic)
                    set linkOK to true
                    break step
                end if
            end step
            if linkOK
                -- compress links
                set linkTemp to linkLogic
                set linkLogic to NULL
                step k from 1 to numberOfLinks
                    if k>=j
                        set jTemp to k+1
                    else
                        set jTemp to k
                    end if
                    if (textLine jTemp of linkTemp) is NOT NULL
                        if k = 1
                            set linkLogic to (textLine jTemp of linkTemp)
                        else
                            set linkLogic to linkLogic&crlf&(textLine jTemp of linkTemp)
                        end if
                    end if
                end step
                set numberOfLinks to textLineCount(linkLogic)
            else
                set numberOfLinks to 0
                send appendGlobal "sqlJoins","ERROR in GenerANTJoin -- LINKLOGIC FAILURE!",""
            end if
        end while
    end if else
        --Joins.NDX is NOT available
        request "WARNING!  Cannot find Join Control Index, "&dbIndex&"." with "OK"
            --break
    end if
else
    -- JOINS.DBF is NOT available
    request "WARNING!  Cannot find Join Control Database, "&dbTable&"." with "OK"
        --break
end if
```

```
    get closeDBIndexFile(index1)
    get closeDBIndexFile(index2)
    get closeDBFile(dbTable)

return 1 end generAntJoins
```

I claim:

1. A method for providing a plurality of query instructions to a database, comprising the steps of:

receiving a plurality of input dimensions for selectively obtaining relational information between data in the database;

checking at least one driver table for relational information about the database;

automatically locating an intersection of common data between the plurality of input dimensions; and generating a plurality of query instructions for communication to the database, the plurality of query instructions representing the relational query between the plurality of input dimensions.

2. The method defined in claim 1, wherein the plurality of query instructions comprise structured query language instructions.

3. The method defined in claim 2, wherein the plurality of structured query language instructions generated are compatible with the database.

4. The method defined in claim 1, wherein the at least one driver table comprises a plurality of driver tables.

5. The method defined in claim 4, further comprising the step of detecting the existence of relevant facts from identified data table, the relevant facts based upon a predefined criteria.

6. The method defined in claim 5, further comprising the step of generating at least one link between a first relevant fact within the input dimension and a second relevant fact within the identified data table.

7. The method defined in claim 6, further comprising the step of checking the integrity of the at least one link for consistency between the input dimension and data in the at least one data table.

8. The method defined in claim 6, further comprising the step of providing to a user a visual representation of the at least one link.

9. The method defined in claim 1, further comprising the step of defining at least one function for measurement based upon the predefined criteria.

10. The method defined in claim 1, wherein the plurality of input dimensions is supplied by a user.

11. The method defined in claim 10, wherein the user-supplied input dimensions are received through a multi-dimensional user interface.

12. The method defined in claim 11, wherein the multi-dimensional user interface receives input dimensions through a Cartesian coordinate input graph.

13. The method defined in claim 1, wherein the step of automatically locating the intersection comprises identifying a minimum subset of data tables.

14. The method defined in claim 1, further comprising the step of dynamically selecting at least one output table representative of the intersection.

15. A method for providing a plurality of query instructions to a database, comprising the steps of:

receiving a plurality of user-supplied input dimensions to query the database, the user-supplied input dimensions for selectively obtaining relational information between data in the database;

checking at least one driver table for relational information about the database;

identifying a subset of data tables from the plurality of data tables, the subset of data tables corresponding to the user-supplied input dimensions;

automatically locating an intersection of common data between the subset of data tables;

dynamically selecting at least one output table representative of the intersection of the common data between the subset of data tables;

generating at least one link between a first data within the subset of data tables and a corresponding data within the at least one output table;

automatically checking the integrity of the at least one link to confirm the existence of the first data in the output table; and generating a plurality of query instructions for communication to the database, the plurality of query instructions representing the relationship identified through the at least one link between the user-supplied input dimensions.

16. A system for providing a plurality of query instructions for communication to a database having a plurality of data stored in the database, comprising:

input logic operable to receive a plurality of input dimensions, each input dimension representing data stored in the database;

means coupled to the input logic for automatically identifying an intersection of data common to the plurality of input dimensions; and an output coupled to the database, the output for communicating a plurality of query instructions to the database, the plurality of query instructions developed from the intersection of common data.

17. The system defined in claim 16, further comprising means for generating at least one link between the common data from the input dimensions.

18. The system defined in claim 17, further comprising means for checking the integrity of the at least one link for consistency between data associated with the input dimensions.

19. The system defined in claim 18, further comprising a display, the display for providing a visual representation of the at least one link.

20. The system defined in claim 19, wherein the display comprises a multi-dimensional user interface.

21. The system defined in claim 20, wherein the multi-dimensional user interface comprises a Cartesian coordinate graphical input.

22. The system defined in claim 16, wherein the input logic is operable to receive constraints on the input dimensions.

23. The system defined in claim 16, wherein the input logic is operable to receive at least one predetermined function for measurement based upon the predefined criteria.

24. A system for providing a plurality of structured query language instructions for communication to a database having a plurality of data tables for organizing data stored in the database based upon a predefined criteria, comprising:

a memory for storing at least one driver table providing a translation of the relationship of the data tables in the database;

means coupled to the memory for providing an indication of the data tables stored in the database and communicating such indication to a user;

input logic coupled to the memory, the input logic operable to receive a plurality of user-supplied input dimensions, each input dimension identifying at least one data table stored in the database;

a display coupled to the input logic, the display for providing a visual representation of the plurality of input dimensions;

means coupled to the input logic for automatically identifying an intersection of data common to the plurality of input dimensions and generating at least one intersection table of common data in response to the identification;

means coupled to the display for generating at least one link identifying the common data between the identified input dimensions and displaying the at least one link on the display; and an output coupled to the database, the output for communicating a plurality of structured query language instructions to query the database for requested data, the plurality of structured query language instructions developed from the generation of the at least one link.

* * * * *